United States Patent
Alexandrov et al.

(10) Patent No.: US 10,690,469 B2
(45) Date of Patent: Jun. 23, 2020

(54) APPARATUS FOR PLASMA BLASTING

(71) Applicant: Petram Technologies, Inc., Cambridge, MA (US)

(72) Inventors: Igor S. Alexandrov, New York, NY (US); Frank A. Magnotti, Millburn, NJ (US)

(73) Assignee: Petram Technologies, Inc., Jersey City, NJ (US)

( * ) Notice: Subject to any disclaimer, the term of this patent is extended or adjusted under 35 U.S.C. 154(b) by 0 days.

(21) Appl. No.: 16/279,903

(22) Filed: Feb. 19, 2019

(65) Prior Publication Data
US 2019/0186886 A1 Jun. 20, 2019

Related U.S. Application Data

(60) Provisional application No. 62/632,776, filed on Feb. 20, 2018.

(51) Int. Cl.
| F42D 3/00 | (2006.01) |
| F42D 3/04 | (2006.01) |
| F42D 1/08 | (2006.01) |
| F42D 1/00 | (2006.01) |

(52) U.S. Cl.
CPC .............. F42D 3/04 (2013.01); F42D 1/00 (2013.01); F42D 1/08 (2013.01); F42D 3/00 (2013.01)

(58) Field of Classification Search
CPC ..... F42D 3/04; F42D 1/00; F42D 3/00; F42D 1/08; E21C 37/18; E21B 7/15; E21B 43/003

USPC ....... 102/313; 299/14; 175/16; 166/248, 249
See application file for complete search history.

(56) References Cited

U.S. PATENT DOCUMENTS

| 3,679,007 A * | 7/1972 | O'Hare | E21B 7/15 175/16 |
| 4,074,758 A | 2/1978 | Scott | |
| 4,169,503 A | 10/1979 | Scott | |
| 4,345,650 A | 8/1982 | Wesley | |
| 4,653,697 A * | 3/1987 | Codina | B02C 19/18 241/1 |
| 4,741,405 A * | 5/1988 | Moeny | E21B 7/15 175/16 |

(Continued)

FOREIGN PATENT DOCUMENTS

| RU | 2144980 C1 | 1/2000 |
| RU | 2184221 C1 | 6/2002 |

(Continued)

*Primary Examiner* — Michael D David
(74) *Attorney, Agent, or Firm* — Richard A. Baker, Jr.

(57) ABSTRACT

A method, system and apparatus for plasma blasting comprises a solid object having a borehole, a blast probe comprising a high voltage electrode and a ground electrode separated by a dielectric separator, wherein the high voltage electrode and the dielectric separator constitute an adjustable probe tip, and an adjustment unit coupled to the adjustable probe tip, wherein the adjustment unit is configured to selectively extend or retract the adjustable probe tip relative to the ground electrode and a blasting media, wherein at least a portion of the high voltage electrode and the ground electrode are submerged in the blast media. The blasting media comprises water. The adjustable tip permits fine-tuning of the blast.

20 Claims, 7 Drawing Sheets

(56) References Cited

U.S. PATENT DOCUMENTS

| | | | |
|---|---|---|---|
| 5,106,164 A * | 4/1992 | Kitzinger | E21C 37/18 299/14 |
| 5,573,307 A * | 11/1996 | Wilkinson | E21B 7/15 299/14 |
| 5,773,750 A * | 6/1998 | Jae | F42D 3/00 102/302 |
| 6,227,293 B1 | 5/2001 | Huffman | |
| 6,283,555 B1 * | 9/2001 | Arai | F42D 3/00 299/14 |
| 6,457,778 B1 * | 10/2002 | Chung | E21C 37/18 175/16 |
| 6,499,536 B1 | 12/2002 | Ellingsen | |
| 6,761,416 B2 * | 7/2004 | Moeny | E21C 37/16 175/16 |
| 6,935,702 B2 * | 8/2005 | Okazaki | B02C 19/18 299/13 |
| 8,628,146 B2 | 1/2014 | Baltazar-Lopez | |
| 9,896,917 B2 | 2/2018 | Sizonenko et al. | |
| 2001/0011590 A1 | 8/2001 | Thomas | |
| 2006/0038437 A1 * | 2/2006 | Moeny | E21B 7/00 299/14 |
| 2010/0270038 A1 | 10/2010 | Looney et al. | |
| 2014/0027110 A1 | 1/2014 | Ageev et al. | |
| 2014/0251599 A1 | 9/2014 | Linetskiy | |
| 2019/0177944 A1 * | 6/2019 | Magnotti | H05H 1/2406 |
| 2019/0186249 A1 * | 6/2019 | Alexandrov | F42D 3/04 |
| 2019/0186886 A1 * | 6/2019 | Alexandrov | F42D 1/00 |
| 2019/0194882 A1 * | 6/2019 | Magnotti | E21B 7/007 |
| 2019/0271220 A1 * | 9/2019 | Magnotti | E21B 43/263 |

FOREIGN PATENT DOCUMENTS

| | | |
|---|---|---|
| RU | 2194846 C2 | 12/2002 |
| RU | 2199659 C1 | 2/2003 |
| RU | 2213860 C2 | 10/2003 |
| RU | 2261986 C1 | 10/2005 |
| RU | 2272128 C1 | 3/2006 |
| RU | 2282021 C1 | 8/2006 |
| RU | 2283950 C2 | 9/2006 |
| RU | 2295031 C2 | 3/2007 |
| RU | 2298641 C2 | 5/2007 |
| RU | 2298642 C2 | 5/2007 |
| RU | 2314412 C1 | 1/2008 |
| RU | 2317409 C1 | 2/2008 |
| RU | 2327027 C2 | 6/2008 |
| RU | 2007101698 A | 7/2008 |
| RU | 2335658 C2 | 10/2008 |
| RU | 2520672 C2 | 4/2014 |

* cited by examiner

APPARATUS FOR PLASMA BLASTING

CROSS REFERENCE TO RELATED APPLICATIONS

This patent application is a non-provisional application of, and claims the benefit of the filing dates of, U.S. Provisional Patent Application 62/632,776, "Improved Apparatus for Plasma Blasting", filed on Feb. 20, 2018. The disclosures of this provisional patent application is incorporated herein by reference.

This patent application draws from U.S. Pat. No. 8,628, 146, filed by Martin Baltazar-Lopez and Steve Best, issued on Jan. 14, 2010, entitled "Method of and apparatus for plasma blasting". The entire patent incorporated herein by reference. The present patent application was developed as a result of activities undertaken within the scope of an exclusive license agreement between Auburn University and Petram Technologies, Inc, which falls within the definition of a joint research agreement as defined under 35 U.S.C. 100(h), said agreement was in effect on or before the date the inventions claimed herein.

BACKGROUND

Technical Field

The present invention relates to the field of improved plasma blasting. More specifically, the present invention relates to the field of a reusable plasma blasting probe with adjustable probe tip.

Description of the Related Art

The field of surface processing for the excavation of hard rock generally comprises conventional drilling and blasting. Specifically, whether for mining or civil construction, the excavation process generally includes mechanical fracturing and crushing as the primary mechanism for pulverizing/excavating rock. Many of these techniques incorporate the use of chemical explosives. However, these techniques, while being able to excavate the hardest rocks at acceptable efficiencies, are unavailable in many situations where the use of such explosives is prohibited due to safety, vibration, and/or pollution concerns.

An alternate method of surface processing for the excavation of hard rock incorporates the use of electrically powered plasma blasting. In this method, a capacitor bank is charged over a relatively long period of time at a low current, and then discharged in a very short pulse at a very high current into a blasting probe comprised of two or more electrodes immersed in a fluid media. The fluid media is in direct contact with the solid substance or sample to be fractured. These plasma blasting methods however, have been historically expensive due to their inefficiency.

Previous plasma blasting probes suffered from difficulties in reusability due to the lack of control of the direction of the plasma spark. This lack of control also prevented the aiming of the shock waves from the blast into a desired direction.

The present invention, eliminates the issues articulated above as well as other issues with the currently known products.

SUMMARY OF THE INVENTION

A blasting system is described that is made up of a solid object having a borehole. In the borehole, a blast probe is inserted having a plurality of electrodes, wherein the blast probe is positioned within the borehole, wherein at least two of the plurality of electrodes are separated by a dielectric separator. The blast probe wherein the dielectric separator and at least one of the the plurality of electrodes constitute an adjustable probe tip, the electrodes on the same axis with tips opposing each other, the electrodes enclosed in a cage. A blast media made of water or other incompressible fluid wherein the electrodes are submerged in the blast media.

Another aspect of the inventions described herein include a blast probe apparatus comprising a symmetrical cage and a plurality of electrodes. The electrodes are connected to at least one capacitor. The electrodes are separated by a dielectric separator, and the dielectric separator and the electrodes constitute an adjustable probe tip with a maximum gap between the electrodes less than the gap between any of the electrodes and the cage enclosing the electrodes. The electrodes are on an axis with tips opposing each other.

The blasting apparatus may use a plastic cage, and the cage may include a balloon type structure inside of the cage, where the balloon may contains the incompressible fluid. In some embodiments, the cage is a cylinder and in some case the cage has a plurality of rectangular openings on the cylinder walls. The adjustable probe tip could have preset stops to limit adjustment to a set range. The incompressible fluid could be water.

A method for creating a plasma blast is described herein. The method includes charging a capacitor bank; discharging the capacitor bank to two electrodes said electrodes mounted on an axis with tips opposing each other and enclosed in a cage, wherein the cage is a cylinder with at least one opening; creating a plasma explosion between the two electrodes; and directing a symmetrical focus of the plasma explosion through openings in the cage.

In the method, the at least one opening could be rectangular and the rectangular openings could have rounded corners.

DETAILED DESCRIPTION OF THE INVENTION

Figure 1:
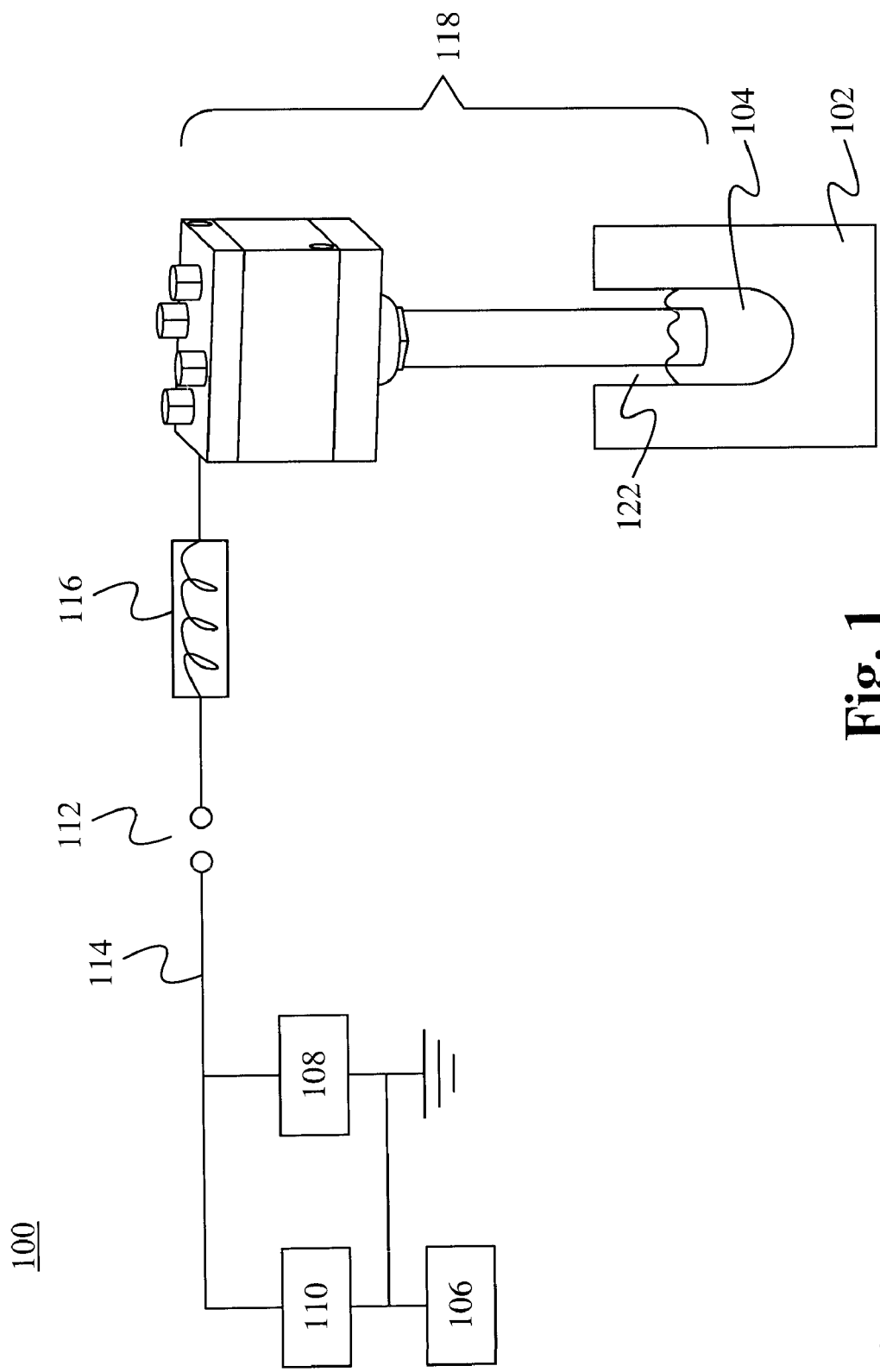
FIG. 1 shows the plasma blasting system in accordance with some embodiments of the Present Application

FIG. 1 illustrates a plasma blasting system 100 for fracturing a solid 102 in accordance with some embodiments where electrical energy is deposited at a high rate (e.g. a few microseconds), into a blasting media 104 (e.g. an electrolyte), wherein this fast discharge in the blasting media 104 creates plasma confined in a borehole 122 within the solid 102. A pressure wave created by the discharge plasma emanates from the blast region thereby fracturing the solid 102.

In some embodiments, the plasma blasting system 100 comprises a power supply 106, an electrical storage unit 108, a voltage protection device 110, a high voltage switch 112, transmission cable 114, an inductor 116, a blasting probe 118 and a blasting media 104. In some embodiments, the plasma blasting system 100 comprises any number of blasting probes and corresponding blasting media. In some embodiments, the inductor 116 is replaced with the inductance of the transmission cable 114. Alternatively, the inductor 116 is replaced with any suitable inductance means as is well known in the art. The power supply 106 comprises any electrical power supply capable of supplying a sufficient voltage to the electrical storage unit 108. The electrical storage unit 108 comprises a capacitor bank or any other suitable electrical storage means. The voltage protection device 110 comprises a crowbar circuit, with voltage-reversal protection means as is well known in the art. The high voltage switch 112 comprises a spark gap, an ignitron, a solid state switch, or any other switch capable of handling high voltages and high currents. In some embodiments, the transmission cable 114 comprises a coaxial cable. Alternatively, the transmission cable 114 comprises any transmission cable capable of adequately transmitting the pulsed electrical power.

In some embodiments, the power supply 106 couples to the voltage protection device 110 and the electrical storage unit 108 via the transmission cable 114 such that the power supply 106 is able to supply power to the electrical storage unit 108 through the transmission cable 114 and the voltage protection device 110 is able to prevent voltage reversal from harming the system. In some embodiments, the power supply 106, voltage protection device 110 and electric storage unit 108 also couple to the high voltage switch 112 via the transmission cable 114 such that the switch 112 is able to receive a specified voltage/current from the electric storage unit 108. The switch 112 then couples to the inductor 116 which couples to the blasting probe 118 again via the transmission cable 114 such that the switch 112 is able to selectively allow the specified voltage/amperage received from the electric storage unit 108 to be transmitted through the inductor 116 to the blasting probe 118.

Figure 2A:
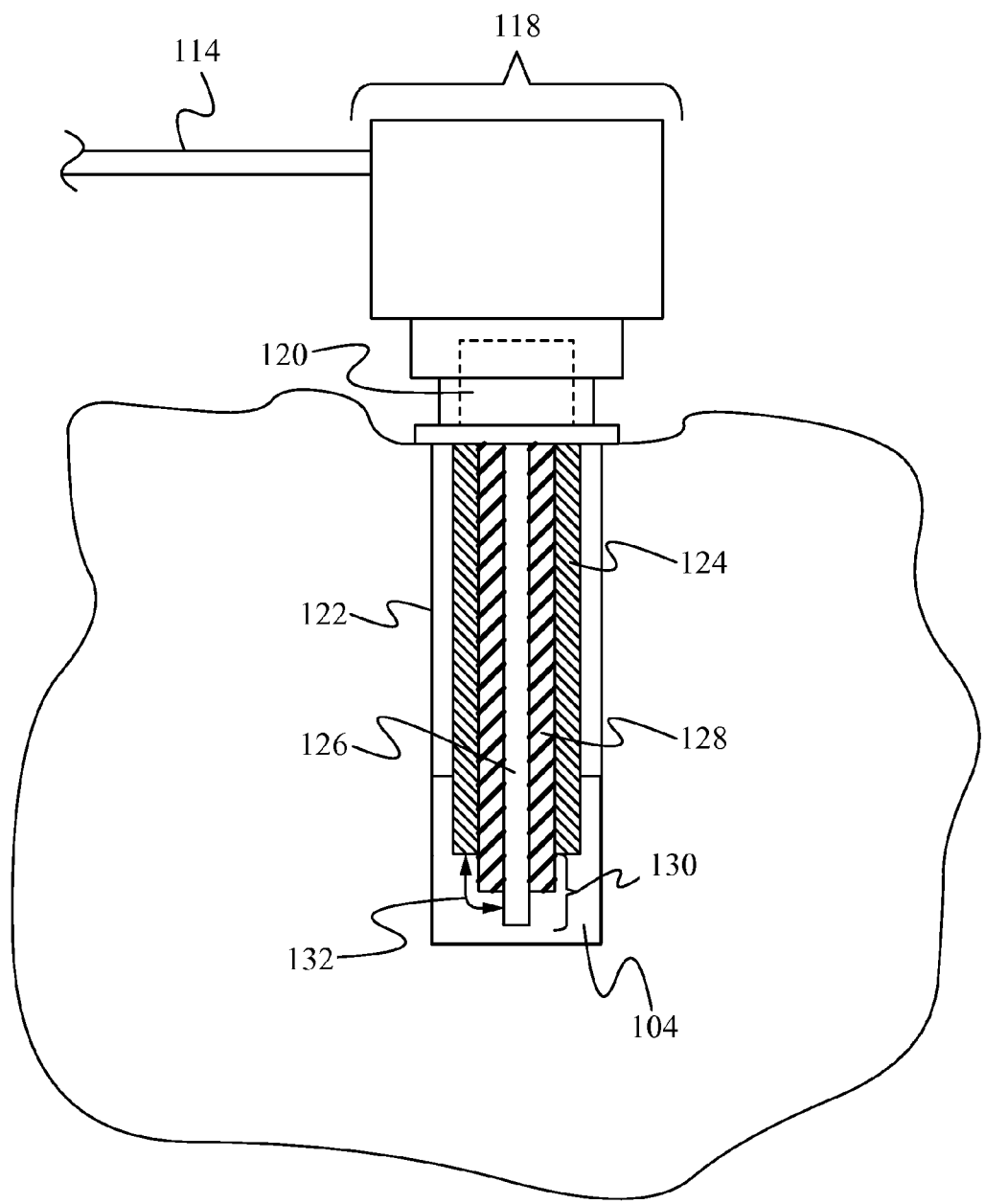
FIG. 2A shows a close up view of the blasting probe in accordance with some embodiments of the Present Application.
Figure 2B:
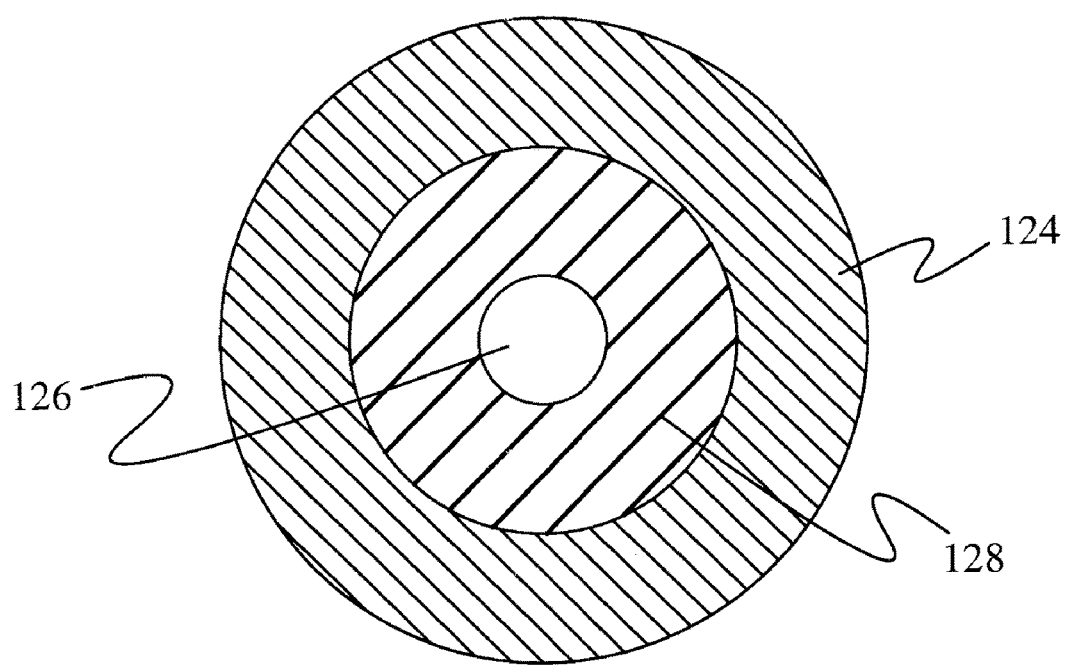
FIG. 2B shows an axial view of the blasting probe in accordance with some embodiments of the Present Application.
Figure 5:
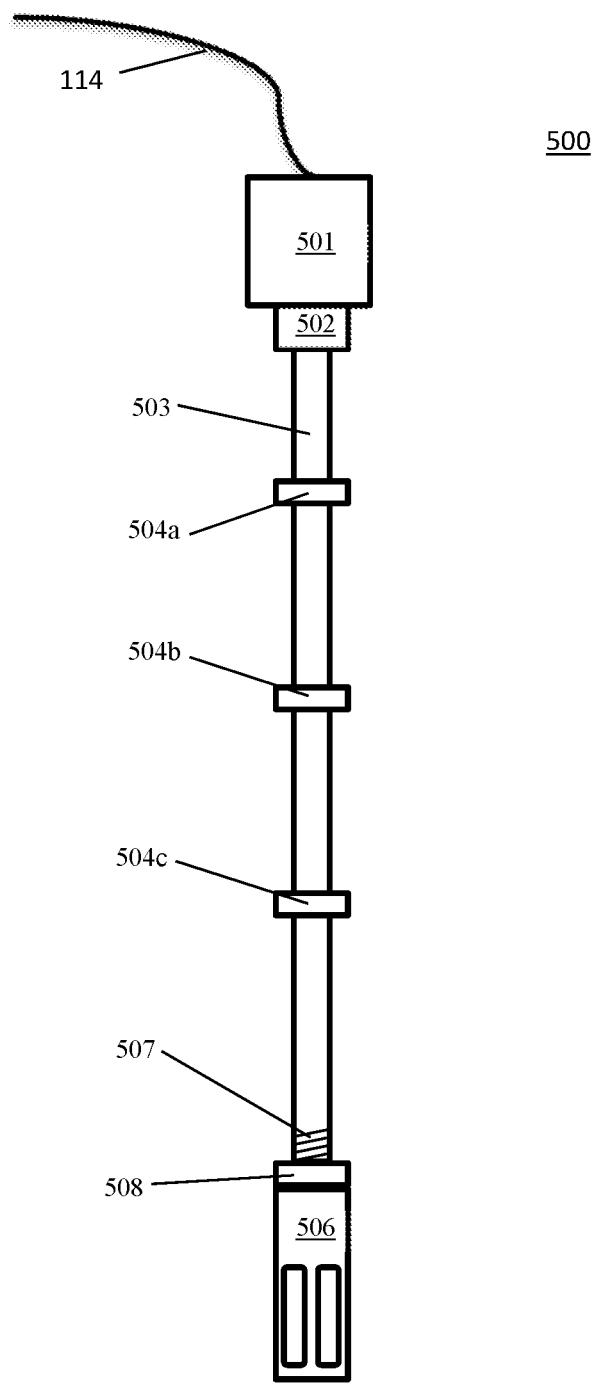
FIG. 5 shows a drawing of the improved probe from the top to the blast tip.
Figure 6:
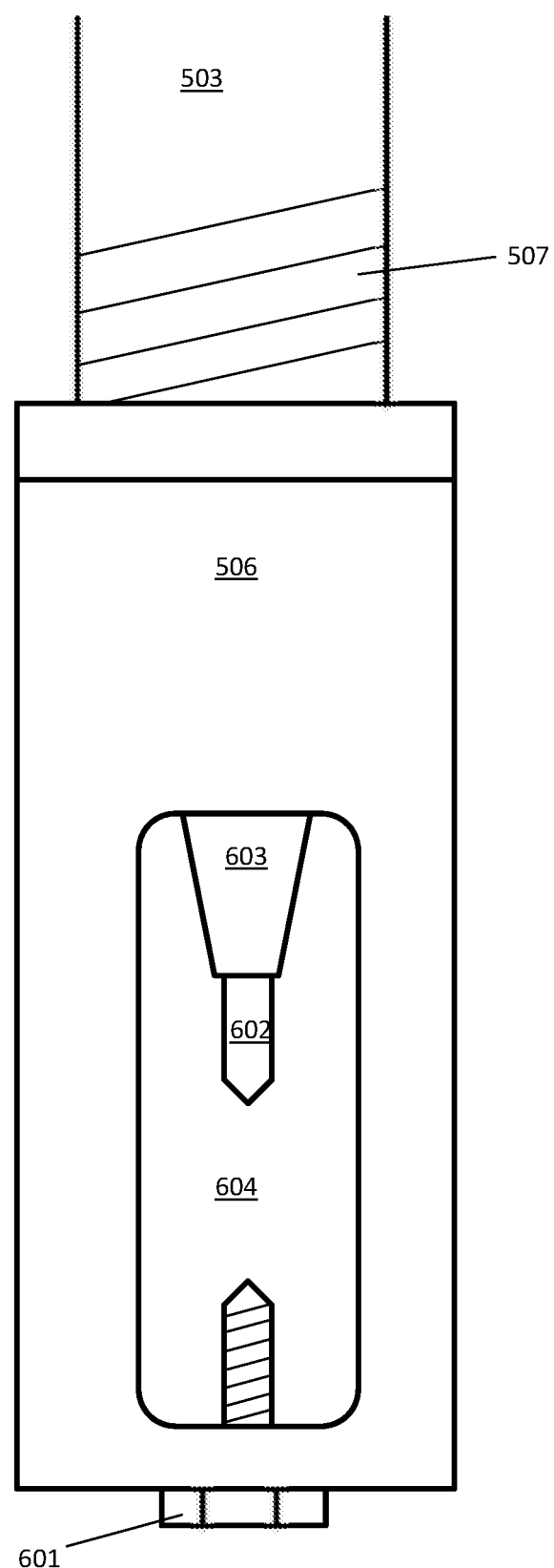
FIG. 6 shows a detailed view into the improved blast tip.

FIG. 2A shows one embodiment for a blasting probe. FIGS. 5 and 6 show another embodiment. As seen in FIG. 2A, the blasting probe 118 comprises an adjustment unit 120, one or more ground electrodes 124, one or more high voltage electrodes 126 and a dielectric separator 128, wherein the end of the high voltage electrode 126 and the dielectric separator 128 constitute an adjustable blasting probe tip 130. The adjustable blasting probe tip 130 is reusable. Specifically, the adjustable blasting probe tip 130 comprises a material and is configured in a geometry such that the force from the blasts will not deform or otherwise harm the tip 130. Alternatively, any number of dielectric separators comprising any number and amount of different dielectric materials are able to be utilized to separate the ground electrode 124 from the high voltage electrode 126. In some embodiments, as shown in FIG. 2B, the high voltage electrode 126 is encircled by the hollow ground electrode 124. Furthermore, in those embodiments the dielectric separator 128 also encircles the high voltage electrode 126 and is used as a buffer between the hollow ground electrode 124 and the high voltage electrode 126 such that the three 124, 126, 128 share an axis and there is no empty space between the high voltage and ground electrodes 124, 126. Alternatively, any other configuration of one or more ground electrodes 124, high voltage electrodes 126 and dielectric separators 128 are able to be used wherein the dielectric separator 128 is positioned between the one or more ground electrodes 124 and the high voltage electrode 126. For example, the configuration shown in FIG. 2B could be switched such that the ground electrode was encircled by the high voltage electrode with the dielectric separator again sandwiched in between, wherein the end of the ground electrode and the dielectric separator would then comprise the adjustable probe tip.

The adjustment unit 120 comprises any suitable probe tip adjustment means as are well known in the art. Further, the adjustment unit 120 couples to the adjustable tip 130 such that the adjustment unit 120 is able to selectively adjust/move the adjustable tip 130 axially away from or towards the end of the ground electrode 124, thereby adjusting the electrode gap 132. In some embodiments, the adjustment unit 120 adjusts/moves the adjustable tip 130 automatically. The term "electrode gap" is defined as the distance between the high voltage and ground electrode 126, 124 through the blasting media 104. Thus, by moving the adjustable tip 130 axially in or out in relation to the end of the ground electrode 124, the adjustment unit 120 is able to adjust the resistance and/or power of the blasting probe 118. Specifically, in an electrical circuit, the power is directly proportional to the resistance. Therefore, if the resistance is increased or decreased, the power is correspondingly varied. As a result, because a change in the distance separating the electrodes 124, 126 in the blasting probe 118 determines the resistance of the blasting probe 118 through the blasting media 104 when the plasma blasting system 100 is fired, this adjustment of the electrode gap 132 is able to be used to vary the electrical power deposited into the solid 102 to be broken or fractured. Accordingly, by allowing more refined control over the electrode gap 132 via the adjustable tip 130, better control over the blasting and breakage yield is able to be obtained.

Figure 3:
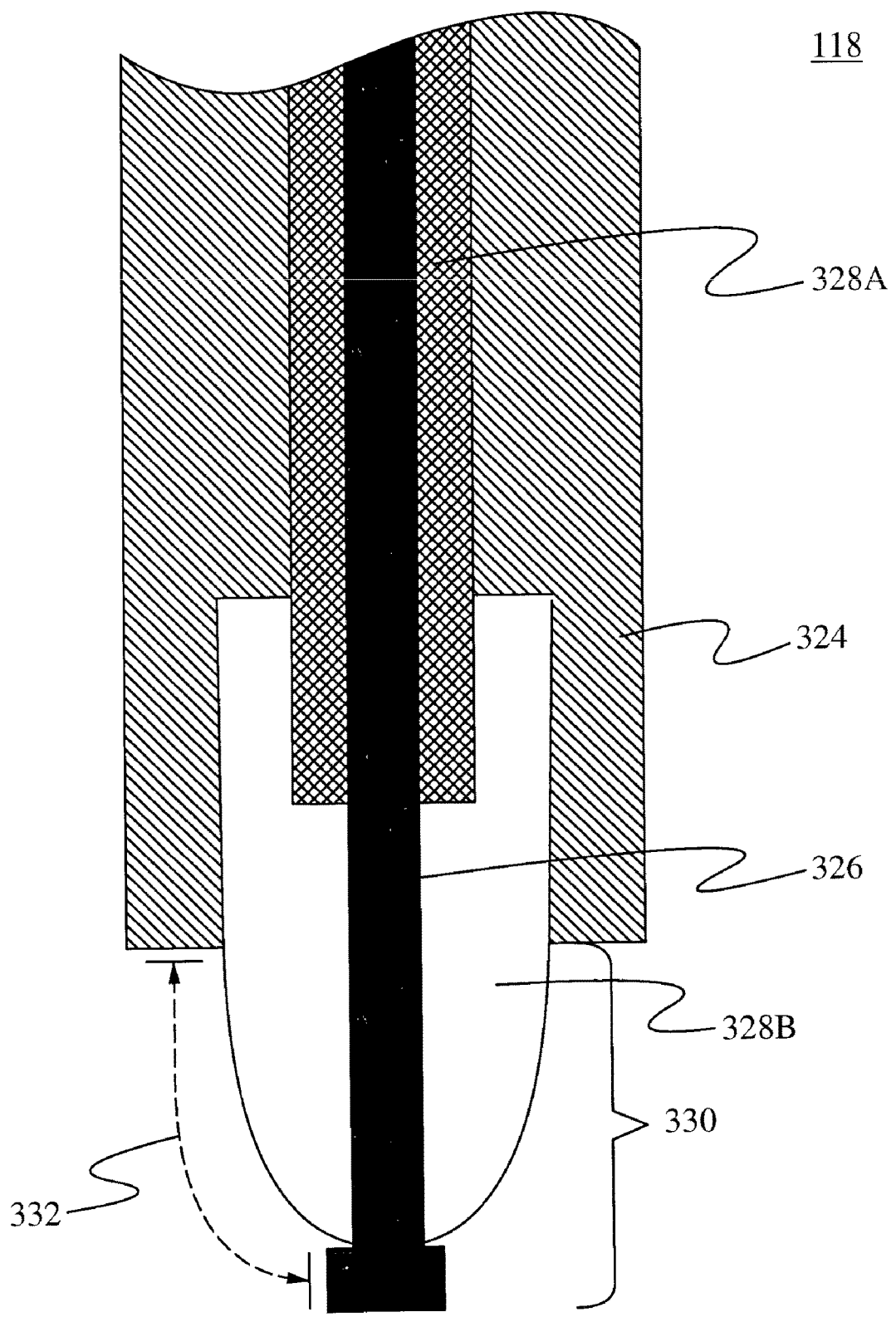
FIG. 3 shows a close up view of the blasting probe comprising two dielectric separators for high energy blasting in accordance with some embodiments of the Present Application.

Another embodiment, as shown in FIG. 3, is substantially similar to the embodiment shown in FIG. 2A except for the differences described herein. As shown in FIG. 3, the blasting probe 118 comprises an adjustment unit (not shown), a ground electrode 324, a high voltage electrode 326, and two different types of dielectric separators, a first dielectric separator 328A and a second dielectric separator 328B. Further, in this embodiment, the adjustable blasting probe tip 330 comprises the end portion of the high voltage electrode 326 and the second dielectric separator 328B. The adjustment unit (not shown) is coupled to the high voltage electrode 326 and the second dielectric separator 328B (via the first dielectric separator 328A), and adjusts/moves the adjustable probe tip 330 axially away from or towards the end of the ground electrode 324, thereby adjusting the electrode gap 332. In some embodiments, the second dielectric separator 328B is a tougher material than the first dielectric separator 328A such that the second dielectric separator 328B better resists structural deformation and is therefore able to better support the adjustable probe tip 330. Similar to the embodiment in FIG. 2A, the first dielectric 328A is encircled by the ground electrode 324 and encircles the high voltage electrode 326 such that all three share a common axis. However, unlike FIG. 2A, towards the end of the high voltage electrode 326, the first dielectric separator 328A is supplanted by a wider second dielectric separator 328B which surrounds the high voltage electrode 326 and forms a conic or parabolic support configuration as illustrated in the FIG. 3. The conic or parabolic support configuration is designed to add further support to the adjustable probe tip 330. Alternatively, any other support configuration could be used to support the adjustable probe tip. Alternatively, the adjustable probe tip 330 is configured to be resistant to deformation. In some embodiments, the second dielectric separator comprises a polycarbonate tip. Alternatively, any other dielectric material is able to be used. In some embodiments, only one dielectric separator is able to be used wherein the single dielectric separator both surrounds the high voltage electrode throughout the blast probe and forms the conic or parabolic support configuration around the adjustable probe tip. In particular, the embodiment shown in FIG. 3 is well suited for higher power blasting, wherein the adjustable blast tip tends to bend and ultimately break. Thus, due to the configuration shown in FIG. 3, the adjustable probe tip 330 is able to be reinforced with the second dielectric material 328B in that the second dielectric material 328B is positioned in a conic or parabolic geometry around the adjustable tip such that the adjustable probe tip 330 is protected from bending due to the blast.

In one embodiment, water is used as the blasting media 104. The water could be poured down the borehole 122 before or after the probe 118 is inserted in the borehole 122. In some embodiments, such as horizontal boreholes 122 or bore holes 122 that extend upward, the blasting media 104 could be contained in a balloon or could be forced under pressure into the hole 122 with the probe 118.

As shown in FIGS. 1 and 2, the blasting media 104 is positioned within the borehole 122 of the solid 102, with the adjustable tip 130 and at least a portion of the ground electrode 124 suspended within the blasting media 104 within the solid 102. Correspondingly, the blasting media 104 is also in contact with the inner wall of the borehole 122 of the solid 102. The amount of blasting media 104 to be used is dependent on the size of the solid and the size of the blast desired and its calculation is well known in the art.

Figure 4:
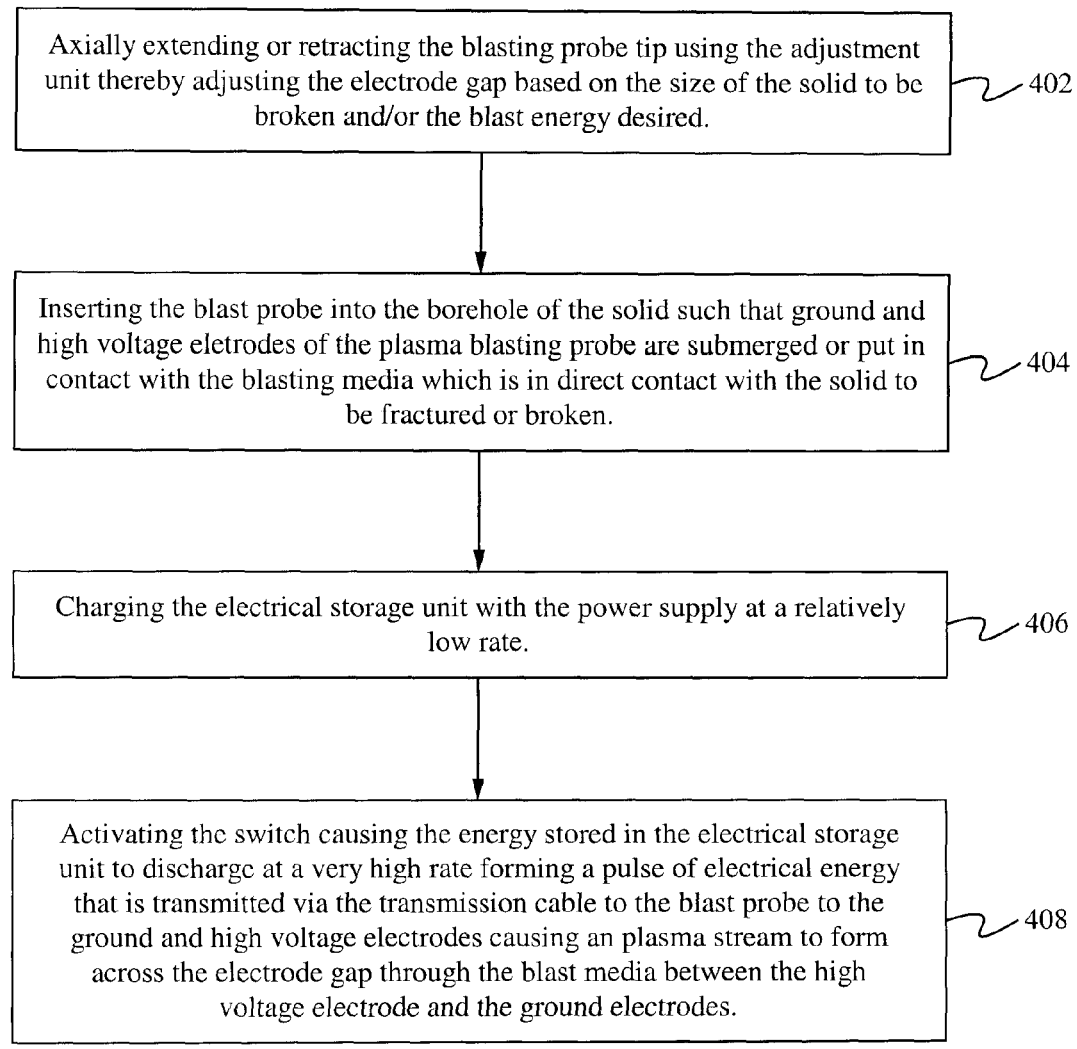
FIG. 4 shows a flow chart illustrating a method of using the plasma blasting system to break or fracture a solid in accordance with some embodiments of the Present Application.

The method and operation 400 of the plasma blasting system 100 will now be discussed in conjunction with a flow chart illustrated in FIG. 4. In operation, as shown in FIGS. 1 and 2, the adjustable tip 130 is axially extended or retracted by the adjustment unit 120 thereby adjusting the electrode gap 132 based on the size of the solid 102 to be broken and/or the blast energy desired at the step 402. The blast probe 118 is then inserted into the borehole 122 of the solid such that at least a portion of the ground and high voltage electrodes 124, 126 of the plasma blasting probe 118 are submerged or put in contact with the blasting media 104 which is in direct contact with the solid 102 to be fractured or broken at the step 404. Alternatively, the electrode gap 132 is able to be adjusted after insertion of the blasting probe 118 into the borehole 122. The electrical storage unit 108 is then charged by the power supply 106 at a relatively low rate (e.g., a few seconds) at the step 406. The switch 112 is then activated causing the energy stored in the electrical storage unit 108 to discharge at a very high rate (e.g. tens of microseconds) forming a pulse of electrical energy (e.g. tens of thousands of Amperes) that is transmitted via the transmission cable 114 to the plasma blasting probe 118 to the ground and high voltage electrodes 124, 126 causing a plasma stream to form across the electrode gap 132 through the blast media 104 between the high voltage electrode 126 and the ground electrode 124 at the step 408.

During the first microseconds of the electrical breakdown, the blasting media 104 is subjected to a sudden increase in temperature (e.g. about 5000 to 10,000° C.) due to a plasma channel formed between the electrodes 124, 126, which is confined in the borehole 122 and not able to dissipate. The heat generated vaporizes or reacts with part of the blasting media 104, depending on if the blasting media 104 comprises a liquid or a solid respectively, creating a steep pressure rise confined in the borehole 122. Because the discharge is very brief, a blast wave comprising a layer of compressed water vapor (or other vaporized blasting media 104) is formed in front of the vapor containing most of the energy from the discharge. It is this blast wave that then applies force to the inner walls of the borehole 122 and ultimately breaks or fractures the solid 102. Specifically, when the pressure expressed by the wave front (which is able to reach up to 2.5 GPa), exceeds the tensile strength of the solid 102, fracture is expected. Thus, the blasting ability depends on the tensile strength of the solid 102 where the plasma blasting probe 118 is placed, and on the intensity of the pressure formed. The plasma blasting system 100 described herein is able to provide pressures well above the tensile strengths of common rocks (e.g. granite=10-20 MPa, tuff=1-4 MPa, and concrete=7 MPa). Thus, the major cause of the fracturing or breaking of the solid 102 is the impact of this compressed water vapor wave front which is comparable to one resulting from a chemical explosive (e.g., dynamite).

As the reaction continues, the blast wave begins propagating outward toward regions with lower atmospheric pressure. As the wave propagates, the pressure of the blast wave front falls with increasing distance. This finally leads to cooling of the gasses and a reversal of flow as a low-pressure region is created behind the wave front, resulting in equilibrium.

If the blasting media 104 comprises a thixotropic fluid as discussed above, when the pulsed discharge vaporizes part of the fluid, the other part rheologically reacts by instantaneously increasing in viscosity, due to being subjected to the force of the vaporized wave front, such that outer part of the fluid acts solid like. This now high viscosity thixotropic fluid thereby seals the borehole 122 where the blasting probe 118 is inserted. Simultaneously, when the plasma blasting system 100 is discharged, and cracks or fractures begin to form in the solid 102, this newly high viscosity thixotropic fluid temporarily seals them thereby allowing for a longer time of confinement of the plasma. Thus, the vapors are prevented from escaping before building up a blast wave with sufficient pressure. This increase in pressure makes the blasting process 400 described herein more efficient, resulting in a more dramatic breakage effect on the solid 102 using the same or less energy compared to traditional plasma blasting techniques when water or other non-thixotropic media are used.

Similarly, if the blasting media 104 comprises a ER fluid as discussed above, when the pulsed discharge vaporizes part of the fluid, a strong electrical field is formed instantaneously increasing the non-vaporized fluid in viscosity such that it acts solid like. Similar to above, this now high viscosity ER fluid thereby seals the borehole 122 where the blasting probe 118 is inserted. Simultaneously, when the plasma blasting system 100 is discharged, and cracks or fractures begin to form in the solid 102, this newly high viscosity ER fluid temporarily seals them thereby allowing for a longer time of confinement of the plasma. Thus, again the vapors are prevented from escaping before building up a blast wave with sufficient pressure.

During testing, the blast probe of the blasting system described herein was inserted into solids comprising either concrete or granite with cast or drilled boreholes having a one inch diameter. A capacitor bank system was used for the electrical storage unit and was charged at a low current and then discharged at a high current via the high voltage switch 112. Peak power achieved was measured in the megawatts. Pulse rise times were around 10-20 μsec and pulse lengths were on the order of 50-100 μsec. The system was able to produce pressures of up to 2.5 GPa and break concrete and granite blocks with masses of more than 850 kg.

FIG. 5 shows an alternative probe 500 embodiment. Probe coupler 501 electrically connects to wires 114 for receiving power from the capacitors 108 and mechanically connects to tethers (could be the wires 114 or other mechanical devices to prevent the probe 500 from departing the borehole 122 after the blast. The probe coupler 501 may incorporate a high voltage coaxial BNC-type high voltage/high current connector to compensate lateral Lorentz' forces on the central electrode and to allow for easy connection of the probe 500 to the wires 114. The mechanical connection may include an eye hook to allow carabiners or wire rope clip to connect to the probe 500. Other mechanical connections could also be used. The probe connection 501 could be made of plastic or metal. The probe connector 501 could be circular in shape and 2 inches in diameter for applications where the probe is inserted in a borehole 122 that is the same depth as the probe 500. In other embodiments, the probe 500 may be inserted in a deep hole, in which case the probe connector 501 must be smaller than the borehole 122.

The probe connector 501 is mechanically connected to the shaft connector 502 with screws, welds, or other mechanical connections. The shaft connector 502 is connected to the probe shaft 503. The connection to the probe shaft 503 could be through male threads on the top of the probe shaft 503 and female threads on the shaft connector 502. Alternately, the shaft connector 502 could include a set screw on through the side to keep the shaft 503 connected to the shaft connector 502. The shaft connector 502 could be a donut shape and made of stainless steel, copper, aluminum, or another conductive material. Electrically, the shaft connector 502 is connected to the ground side of the wires 114. An insulated wire from the probe connector 501 to the high voltage electrode 602 passes through the center of the shaft connector 502. For a 2 inch borehole 122, the shaft connector could be about 1.75 inches in diameter.

The shaft 503 is a hollow shaft that may be threaded 507 at one (or both) ends. The shaft 503 made of stainless steel, copper, aluminum, or another conductive material. Electrically, the shaft 503 is connected to the ground side of the wires 114 through the shaft connector 502. An insulated wire from the probe connector 501 to the high voltage electrode 602 passes through the center of the shaft 503. Mechanically, the shaft 503 is connected to the shaft connector 502 as described above. At the other end, the shaft 503 is connected to the cage 506 through the threaded bolt 508 into the shafts threads 507, or through another mechanical connection (welding, set screws, etc). The shaft 503 may be circular and 1.5 inches in diameter in a 2 inch borehole 122 application. The shaft may be 40 inches long, in one embodiment. At several intervals in the shaft, blast force inhibitors 504a, 504b, 504c may be placed to inhibit the escape of blast wave and the blasting media 104 during the blast. The blast force inhibitors 504a, 504b, 504c may be made of the same material as the shaft 503 and may be welded to the shaft, machined into the shaft, slip fitted onto the shaft or connected with set screws. The inhibitors 504a, 504b, 504c could be shaped as a donut.

The shaft 503 connects to the cage 506 through a threaded bolt 508 that threads into the shaft's threads 507. This allows adjustment of the positioning of the cage 506 and the blast. Other methods of connecting the cage 503 to the shaft 506 could be used without deviating from the invention (for example, a set screw or welding). The cage 506 may be circular and may be 1.75 inches in diameter. The cage 506 may be 4-6 inches long, and may include 4-8 holes 604 in the side to allow the blast to impact the side of the blast hole 122. These holes 604 may be 2-4 inches high and may be 0.5-1 inch wide, with 0.2-0.4 inch pillars in the cage 506 attaching the bottom of the cage 506 to the top. The cage 506 could be made of high strength steel, carbon steel, copper, titanium, tungsten, aluminum, cast iron, or similar materials of sufficient strength to withstand the blast. Electrically, the cage 506 is part of the ground circuit from the shaft 503 to the ground electrode 601.

In an alternative embodiment, a single blast cage could be made of weaker materials, such as plastic, with a wire connected from the shaft to the ground electrode 601 at the bottom of the cage 506. The plastic could be Polyethylene Terephthalate (PETE or PET), High-Density Polyethylene (HDPE), Polyvinyl Chloride (PVC), Low-Density Polyethylene (LDPE), Polypropylene (PP), Polystyrene or Styrofoam (PS), polycarbonate, polylactide, acrylic, acrylonitrile butadiene (ABS), styrene, Phenolics or phenol formaldehyde (PF), Urea-formaldehyde (UF), Polyetheretherketone (PEEK), Maleimide/bismaleimide, Polyetherimide (PEI), Plastarch material, Polylactic acid (PLA), Furan, Silicon, Polysulfone, fiberglass, nylon, or other materials. Some embodiments could use cardboard, wood, or similar.

In one embodiment, the blast cage 506 consists of plastic as in the above embodiment, with a disposable electrodes 601, 602. The cage could include a balloon type structure inside of the plastic cage 506, the balloon holding the blasting media 104. In this embodiment, the blast cage 506 and electrodes 601, 602 are disposable, and used for a single blast. Once the blast is complete, the probe 500 is removed from the borehole 122 and the entire cage assembly 506, 601, 602 is replaced. In a similar embodiment, the balloon and cage could be integrated into a single structure. This combined structure could be a single shot, disposable cage 506 made of a plastic material with the electrodes 601, 602 mounted inside, filled with the blasting media 104. The combined structure could screw onto the bottom of the shaft 503 and shaft thread 507, with electrical contacts through the screw for the ground electrode 601 and through a contact connection in the middle to the positive electrode 602. In some embodiments, each combined structure has a unique, pre-set gap between the electrodes 601, 602. In other embodiments, a screw could be turned to adjust the gap.

The details of the cage 506 can be viewed in FIG. 6. A ground electrode 601 is located at the bottom of the cage 506. The ground electrode 601 is made of a conductive material such as steel, aluminum, copper or similar. The ground electrode 601 could be a bolt screwed in female threads at the bottom of the cage 506. Or a nut could be inserted into the bottom of the cage for threading the bolt 601 and securing it to the cage 506. The bolt 601 can be adjusted with washers or nuts on both sides of the cage 506 to allow regulate the gap between the ground electrode bolt 601 and the high voltage electrode 602, depending upon the type of solid 102.

The wire that runs down the shaft 503, as connected to the wires 114 at the probe connector 501, is electrically connected to the high voltage electrode 602. A dielectric separator 603 keeps the electricity from coming in contact with the cage 506. Instead, when the power is applied, a spark is formed between the high voltage electrode 602 and the ground electrode 601. In order to prevent the spark from forming between the high voltage electrode 602 and the cage 506, the distance between the high voltage electrode 602 and the ground electrode 601 must be less than the distance from the high voltage electrode 602 and the cage 506 walls. The two electrodes 601, 602 are on the same axis with the tips opposing each other. If the cage is 1.75 inches in diameter, the cage 506 walls will be about 0.8 inches from the high voltage electrode 602, so the distance between the high voltage electrode 602 and the ground electrode 601 should be less than 0.7 inches. In another embodiment, an insulator could be added inside the cage to prevent sparks between the electrode 602 and the cage when the distance between the high voltage electrode 602 and the ground electrode 601 is larger. In some embodiments, a mechanical stop is added to the screw mechanism on the ground electrode 601 not allowing the screw to be backed off more than the distance to the cage 506. Conversely the electrodes 601, 602, based on a function of voltage should maintain a minimum distance and allow enough liquid to form a plasma ball. Another mechanical stop is added in the screw mechanism on the ground electrode 601 not allowing the electrodes 601, 602 to get closer than this distance. In effect a min and max travel distance of the adjustable electrode with mechanical stops are added.

In another embodiment, the adjustable electrode travel is automated through an externally controlled motor which drives the screw on the ground electrode 601 and set by an operator based on an initial setting and feedback from previous blasts. This motor could be an electric motor or a pneumatic device for moving the screw with air pressure. In another embodiment, the screw could be used with water or other fluid pressure. By controlling the electrode travel remotely, multiple blasts could be accomplished without removing the probe 500 from the borehole 122.

This cage 506 design creates a mostly cylindrical shock wave with the force applied to the sides of the borehole 122. In another embodiment, additional metal or plastic cone-shaped elements may be inserted around lower 601 and upper electrodes 602 to direct a shock wave outside the probe and to reduce axial forces inside the cage.

The metric that drives the consumable cost is the cost of the entire probe 500 divided by its useful life in numbers of blasts. Therefore, multiple embodiments from high use ruggedized cages to low cost disposable cages 506 are possible. The lowest cost approach would be a disposable plastic cage 506. However, in this case the metal adjustable electrode 601 must still be connected to the grounding metal outer casing. This can be done through the use of an external wire connecting the adjustable electrode 601 to the metal housing 503.

In one embodiment, a balloon filled with water could be inserted in the cage 506 or the cage 506 could be enclosed in a water filled balloon to keep the water around the electrodes 601, 602 in a horizontal or upside down application.

The method of and apparatus for plasma blasting described herein has numerous advantages. Specifically, by adjusting the blasting probe's tip and thereby the electrode gap, the plasma blasting system is able to provide better control over the power deposited into the specimen to be broken. Consequently, the power used is able to be adjusted according to the size and tensile strength of the solid to be broken instead of using the same amount of power regardless of the solid to be broken. Furthermore, the system efficiency is also increased by using a thixotropic or reactive materials (RM) blasting media in the plasma blasting system. Specifically, the thixotropic or RM properties of the blasting media maximize the amount of force applied to the solid relative to the energy input into the system by not allowing the energy to easily escape the borehole as described above and to add energy from the RM reaction. Moreover, because the thixotropic or RM blasting media is inert, it is safer than the use of combustible chemicals. As a result, the plasma blasting system is more efficient in terms of energy, safer in terms of its inert qualities, and requires smaller components thereby dramatically decreasing the cost of operation.

Accordingly, for the mining and civil construction industries this will represent more volume of rock breakage per blast at lower cost with better control. For the public works construction around populated areas this represents less vibration, reduced noise and little to no flying rock produced. For the space exploration industry where chemical explosives are a big concern, the use of this inert blasting media is an excellent alternative. Overall, the method of and apparatus for plasma blasting described herein provides an effective reduction in cost per blast and a higher volume breakage yield of a solid substance while being safe, environmentally friendly and providing better control.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

The foregoing devices and operations, including their implementation, will be familiar to, and understood by, those having ordinary skill in the art.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

The invention claimed is:

1. A blasting system comprising:
   a solid object having a borehole;
   a blast probe having a plurality of electrodes, said electrodes connected to at least one capacitor, wherein the blast probe is positioned within the borehole, wherein at least two of the plurality of electrodes are separated by a dielectric separator, and wherein the dielectric separator and at least one of the at least two of the plurality of electrodes constitute an adjustable probe tip with a maximum gap between the electrodes less than the gap between any of the electrode and a symmetrical cage enclosing the electrodes, said electrodes on an axis with tips opposing each other;
   a blast media comprising an incompressible fluid wherein the plurality of electrodes are submerged in the blast media; and
   a reactive material added around a spark gap to additionally increase energy of a plasma blast.

2. The blasting system of claim 1 wherein the cage is plastic.

3. The blasting system of claim 1 wherein the cage encloses a balloon type structure that is placed inside of the cage.

4. The blasting system of claim 3 wherein the balloon type structure contains the incompressible fluid.

5. The blasting system of claim 1 wherein the cage is a cylinder.

6. The blasting system of claim 5 wherein the cage has a plurality of rectangular openings on the walls of the cylinder.

7. The blasting system of claim 6 wherein the rectangular openings have rounded corners.

8. The blasting system of claim 1 wherein the adjustable probe tip has preset stops to limit adjustment to a set range.

9. The blasting system of claim 1 wherein the incompressible fluid is water.

10. A blast probe apparatus comprising:
 a symmetrical cage;
 a plurality of electrodes, said electrodes connected to at least one capacitor, wherein at least two of the plurality of electrodes are separated by a dielectric separator, and wherein the dielectric separator and at least one of the at least two of the plurality of electrodes constitute an adjustable probe tip with a maximum gap between the electrodes less than the gap between any of the electrodes and the cage enclosing the electrodes, said electrodes on an axis with tips opposing each other.

11. The blast probe apparatus of claim 10 wherein the cage is plastic.

12. The blast probe apparatus of claim 10 wherein the cage encloses a balloon type structure that is placed inside of the cage.

13. The blast probe apparatus of claim 12 wherein the balloon type structure contains the incompressible fluid.

14. The blast probe apparatus of claim 10 wherein the cage is a cylinder.

15. The blast probe apparatus of claim 14 wherein the cage has a plurality of rectangular openings on walls of the cylinder.

16. The blast probe apparatus of claim 15 wherein the rectangular openings have rounded corners.

17. The blast probe apparatus of claim 10 wherein the adjustable probe tip has preset stops to limit adjustment to a set range.

18. A method for creating a plasma blast, the method comprising:
 charging a capacitor bank;
 discharging the capacitor bank to two electrodes said electrodes mounted on an axis with tips opposing each other and enclosed in a cage, wherein the cage is a cylinder with at least one opening, wherein at least two of the plurality of electrodes are separated by a dielectric separator and at least one of the at least two of the plurality of electrodes constitute an adjustable probe tip with a maximum gap between the electrodes less than the gap between any of the electrodes and the cage enclosing the electrodes;
 creating a plasma explosion between the two electrodes;
 directing a symmetrical focus of the plasma explosion through the at least one opening in the cage.

19. The method of claim 18 wherein the at least one opening is rectangular.

20. The method of claim 19 wherein the rectangular openings have rounded corners.

* * * * *